US009858534B2

United States Patent
Abu-Mostafa et al.

(10) Patent No.: US 9,858,534 B2
(45) Date of Patent: Jan. 2, 2018

(54) WEIGHT GENERATION IN MACHINE LEARNING

(71) Applicant: CALIFORNIA INSTITUTE OF TECHNOLOGY, Pasadena, CA (US)

(72) Inventors: Yaser Said Abu-Mostafa, Pasadena, CA (US); Carlos Roberto Gonzalez, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 462 days.

(21) Appl. No.: 14/451,899

(22) Filed: Aug. 5, 2014

(65) Prior Publication Data

US 2015/0206067 A1    Jul. 23, 2015

Related U.S. Application Data

(60) Provisional application No. 62/015,200, filed on Jun. 20, 2014, provisional application No. 61/907,499, filed on Nov. 22, 2013.

(51) Int. Cl.
*G06F 15/18* (2006.01)
*G06N 99/00* (2010.01)
*G06K 9/62* (2006.01)

(52) U.S. Cl.
CPC ......... *G06N 99/005* (2013.01); *G06K 9/6228* (2013.01)

(58) Field of Classification Search
None
See application file for complete search history.

(56) References Cited

U.S. PATENT DOCUMENTS

| | | | |
|---|---|---|---|
| 5,819,247 | A | 10/1998 | Freund et al. |
| 6,119,083 | A | 9/2000 | Hollier et al. |
| 6,373,483 | B1 | 4/2002 | Becker et al. |
| 6,453,307 | B1 | 9/2002 | Schapire et al. |
| 6,594,586 | B1 | 7/2003 | Song et al. |
| 6,789,069 | B1 | 9/2004 | Barnhill et al. |

(Continued)

FOREIGN PATENT DOCUMENTS

| | | |
|---|---|---|
| EP | 1082646 B1 | 8/2011 |
| EP | 2296105 B1 | 10/2012 |

(Continued)

OTHER PUBLICATIONS

"Machine learning," accessed at https://web.archive.org/web/20141117095534/http://en.wikipedia.org/wiki/Machine_learning, last modified on Nov. 16, 2014, pp. 13.

(Continued)

*Primary Examiner* — Luis Sitiriche
(74) *Attorney, Agent, or Firm* — Moritt Hock & Hamroff LLP; Steven S. Rubin, Esq.

(57) ABSTRACT

Technologies are generally described for systems, devices and methods relating to a machine learning environment. In some examples, a processor may identify a training distribution of a training data. The processor may identify information about a test distribution of a test data. The processor may identify a coordinate of the training data and the test data. The processor may determine, for the coordinate, differences between the test distribution and the training distribution. The processor may determine weights based on the differences. The weights may be adapted to cause the training distribution to conform to the test distribution when the weights are applied to the training distribution.

20 Claims, 5 Drawing Sheets

(56) References Cited

U.S. PATENT DOCUMENTS

| | | |
|---|---|---|
| 6,850,873 B1 | 2/2005 | Bax |
| 6,876,955 B1 | 4/2005 | Fleming et al. |
| 7,275,018 B2 | 9/2007 | Abu-El-Zeet et al. |
| 7,426,497 B2 | 9/2008 | Baccioiu et al. |
| 7,561,158 B2 | 7/2009 | Abe et al. |
| 7,617,164 B2 | 11/2009 | Burges et al. |
| 7,689,520 B2 | 3/2010 | Burges et al. |
| 7,720,830 B2 | 5/2010 | Wen et al. |
| 8,175,384 B1 | 5/2012 | Wang |
| 8,386,401 B2 | 2/2013 | Virkar et al. |
| 8,788,439 B2 | 7/2014 | Martinez et al. |
| 8,798,984 B2 | 8/2014 | Cancedda et al. |
| 2002/0107842 A1 | 8/2002 | Biebesheimer et al. |
| 2005/0071301 A1 | 3/2005 | Kuroiwa |
| 2005/0216426 A1 | 9/2005 | Weston et al. |
| 2005/0228783 A1 | 10/2005 | Shanahan |
| 2006/0143254 A1 | 6/2006 | Chen |
| 2006/0248049 A1 | 11/2006 | Cao et al. |
| 2007/0094171 A1 | 4/2007 | Burges |
| 2007/0203908 A1 | 8/2007 | Wang et al. |
| 2007/0203940 A1 | 8/2007 | Wang et al. |
| 2007/0223808 A1 | 9/2007 | Kerr |
| 2008/0169975 A1 | 7/2008 | Yee |
| 2009/0091443 A1 | 4/2009 | Chen |
| 2009/0132515 A1 | 5/2009 | Lu et al. |
| 2010/0169243 A1 | 7/2010 | Su et al. |
| 2010/0287125 A1 | 11/2010 | Okubo |
| 2011/0119213 A1 | 5/2011 | Elisseeff et al. |
| 2012/0078825 A1 | 3/2012 | Kulkarni et al. |
| 2012/0223889 A1 | 9/2012 | Medlock et al. |
| 2012/0271821 A1 | 10/2012 | Qin et al. |
| 2012/0290316 A1 | 11/2012 | Tidhar |
| 2012/0290319 A1 | 11/2012 | Saria et al. |
| 2012/0330971 A1 | 12/2012 | Thomas et al. |
| 2013/0066452 A1 | 3/2013 | Kobayashi et al. |
| 2013/0118736 A1 | 5/2013 | Usadi |
| 2013/0238533 A1 | 9/2013 | Virkar |
| 2013/0254153 A1 | 9/2013 | Marcheret |
| 2014/0079297 A1 | 3/2014 | Tadayon et al. |
| 2014/0180738 A1 | 6/2014 | Phillipps et al. |
| 2014/0180980 A1 | 6/2014 | Hido et al. |
| 2014/0195466 A1 | 7/2014 | Phillipps et al. |
| 2014/0201126 A1 | 7/2014 | Zadeh et al. |
| 2015/0100530 A1 | 4/2015 | Mnih et al. |
| 2015/0206065 A1 | 7/2015 | Abu-Mostafa et al. |
| 2015/0206066 A1 | 7/2015 | Abu-Mostafa et al. |
| 2015/0206067 A1 | 7/2015 | Abu-Mostafa et al. |
| 2015/0254573 A1 | 9/2015 | Abu-Mostafa et al. |
| 2016/0379140 A1 | 12/2016 | Abu-Mostafa et al. |
| 2017/0011307 A1 | 1/2017 | Abu-Mostafa et al. |

FOREIGN PATENT DOCUMENTS

| | | |
|---|---|---|
| WO | 03040949 A1 | 5/2003 |
| WO | 2014151351 A1 | 9/2014 |
| WO | 2015077555 A2 | 5/2015 |
| WO | 2015077557 A1 | 5/2015 |
| WO | 2015077564 A2 | 5/2015 |

OTHER PUBLICATIONS

International Search Report and Written Opinion for application PCT/US2014/066805, dated Feb. 19, 2015, 10 pages.

International Search Report and Written Opinion for application PCT/US2014/066808, dated Feb. 24, 2015, 15 pages.

International Search Report & Written Opinion for International application with application No. PCT/US15/15669, dated Jun. 3, 2015, 15 pages.

"AdaBoost", AdaBoost—Wikipedia, the free encyclopedia, accessed at http://en.wikipedia.org/wiki/AdaBoost, Last modified on Mar. 26, 2014, 8 Pages.

"Machine learning: Boosting," accessed at http://math.bu.edu/people/mkon/MA751/L17Boosting.pdf, accessed on Jun. 16, 2014, pp. 41.

Bickel, S., et al., "Discriminative Learning under covariate shift," The Journal of Machine Learning Research, 2009, pp. 2137-2155, vol. 10.

Bickel, S., et al., "Discriminative Learning for Differing Training and Test Distributions," In Proceedings of the 24th international conference on Machine learning, 2007, pp. 81-88.

Cao, B., et al., "Distance Metric Learning under Covariate Shift," Proceedings of the Twenty-Second International Joint Conference on Artificial Intelligence, 2011, pp. 1204-1210.

Chen, T., et al., "Feature-Based Matrix Factorization," 2011, pp. 10.

Cortes, C., et al., "Sample Selection Bias Correction Theory," In Algorithmic Learning Theory, 2008, pp. 38-53.

Cortes, C., et al., "Learning Bounds for Importance Weighting," Advances in Neural Information Processing Systems, 2010, pp. 442-450.

Hanczar, B. and Dougherty, E., "The reliability of estimated confidence intervals for classification error rates when only a single sample is available," Pattern Recognition, 2013, pp. 1067-1077, vol. 46.

Huang, J., et al., "Correcting Sample Selection Bias by Unlabeled Data," Proceedings of the 2006 Conference Advances in Neural Information processing systems, 2007, pp. 601-608, vol. 19.

Kohavi, R., et al., "The Utility of Feature Weighting in Nearest-Neighbor Algorithms," Proceedings of the Ninth European Conference on Machine Learning, 1997, pp. 10.

Koren, Y., "Factorization meets the neighborhood: a multifaceted collaborative filtering model," In Proceedings of the 14th ACM SIGKDD international conference on Knowledge discovery and data mining, 2008, pp. 426-434, ACM.

Rajan, S., "A Large-Scale Active Learning System for Topical Categorization on the Web," Proceedings of the 19th international conference on World wide web, 2010, pp. 791-800.

Ren, J., et al., "Type Independent Correction of Sample Selection Bias via Structural Discovery and Re-balancing," In Proceedings of the Eighth SIAM International Conference on Data Mining, 2008, pp. 565-576.

Rosset, S., et al., "A Method for Inferring Label Sampling Mechanisms in Semi-Supervised Learning," Advances in Neural Information Processing Systems 17, 2005, pp. 8.

Shimodaira, H., "Improving predictive inference under covariate shift by weighting the log-likelihood function," Journal of Statistical Planning and Inference, 2000, pp. 227-244, vol. 90.

Sugiyama, M., "Direct Importance Estimation with Model Selection and Its Application to Covariate Shift Adaptation," Advances in neural information processing systems, 2008, pp. 1433-1440.

Tsianos, K. I., et al., "Push-Sum Distributed Dual Averaging for Convex Optimization," In proceeding of IEEE Conference on Decision and Control, 2012, pp. 5453-5458.

Zadrozny, B., "Learning and Evaluating Classifiers under Sample Selection Bias," In Proceedings of the 21st international conference on Machine learning, 2004, pp. 1-8.

Zadrozny, B., et al., "Cost-Sensitive Learning by Cost-Proportionate Example Weighting," Proceedings of the Third IEEE International Conference on Data Mining, 2003, pp. 435-442.

Babenko, B., "Note: A Derivation of Discrete AdaBoost," Department of Computer Science and Engineering, University of California, San Diego, available at https://web.archive.org/web/20110717111635/http://vision.ucsd.edu/~bbabenko/data/boosting_note.pdf, Jul. 17, 2011, pp. 1-3.

Bickel, S., et al., "Discriminative Learning for Differing Training and Test Distributions," Proceedings of the 24th International Conference on Machine Learning, pp. 1-8 (Jul. 24, 2007).

Bickel, S., et al., "Learning under Differing Training and Test Distributions," Dissertation, Universitat Potsdam, pp. 111 (Jul. 22, 2009).

Bylander, T. and Tate, L. "Using Validation Sets to Avoid Overfitting in AdaBoost," Department of Computer Science, University of Texas at San Antonio, pp. 544-549 (2006).

Chiu., H. P., et al., "Learning to generate novel views of objects for class recognition," Computer Vision and Image Understanding, vol. 113, pp. 1183-1197 (2009).

(56) References Cited

OTHER PUBLICATIONS

Extended european search Search Report for Application No. 16172168.3, dated Nov. 25, 2016, pp. 12.
González, C., R., "Optimal Data Distributions in Machine Learning," California Institute of Technology, pp. 125 (May 22, 2015).
González, C. R., and Abu-Mostafa, Y. S., "Four Results in Matching Data Distributions," pp. 1-18 (Jun. 21, 2014).
González, C. R., and Abu-Mostafa, Y. S., "Mismatched Training and Test Distributions Can Outperform Matched Ones," Neural Computation, vol. 27, No. 2, pp. 365-387 (2015).
Guo.,Y., and Schuurmans, D., "A Reformulation of Support Vector Machines for General Confidence Functions," Advances in Machine Learning, pp. 109-119 (Nov. 2009).
Hachiya., H., et al., "Importance-Weighted Least-Squares Probabilistic Classifier for Covariate Shift Adaptation with Application to Human Activity Recognition," Neurocomputing, vol. 80, pp. 93-101 (Mar. 15, 2012).
International Search Report and Written Opinion for International application PCT/US2014/066816, dated Feb. 19, 2015, pp. 14.
Kalai, A. T. et al., "Boosting in the Presence of Noise" [Extended Abstract], Proceedings of the thirty-fifth Annual ACM Symposium on Theory of Computing, pp. 10 (Jun. 9, 2013).
Liu, F., et al., "A Robust Support Vector Data Description Classifier," Proceedings of the 32nd Chinese Control Conference, pp. 3781-3784, (Jul. 26-28, 2013).
Mason, L., et al., "Boosting Algorithms as Gradient Descent," Advances in Neural Information Processing Systems, vol. 12, pp. 512-518 (1999).
Mehrotra, K., et al., "Fault Tolerance of Neural Networks," Final Technical Report, RL-TR-94-93, Syracuse University, pp. 107 (Jul. 1994).
Rockafellar, R. T., "Basic Issues in Lagrangian Optimization," Department of Applied Mathematics University of Washington FS-20 Seattle, WA 98195, USA, pp. 25 (1993).
Sakurada, R., et al.,"Stock Return Prediction using Messages of the Internet Forum," Department of Computer Science and Engineering. Toyohashi Univmily of Technology, pp. 7 (May 31, 2013) (English Abstract).
Silva, L., M., et al., "Data classification with multilayer perceptrons using a generalized error function," Neural Networks, vol. 21, Issue 9, pp. 1302-1310 (2008).
Sugiyama, M., et al., "Covariate Shift Adaptation by Importance Weighted Cross Validation," Journal of Machine Learning Research, vol. 8, pp. 985-1005 (2007).
Sugiyama, M., "Supervised Learning under Non-Stationarity: when input distribution of data changes," Japan Indutrial Publishing Co., Ltd,vol. 18, No. 10, pp. 1-6 (Oct. 1, 2007) (English Abstract).
Vanck, T., et al., "Using Hyperbolic Cross Approximation to measure and compensate Covariate Shift," JMLR: Workshop and Conference Proceedings vol. 29, pp. 435-450 (2013).
"Cross-validation (statistics)," Wikipedia, accessed at https://web.archive.org/web/20131115062828/https://en.wikipedia.org/wiki/Cross-validation_(statistics), modified on Nov. 14, 2013, pp. 6.
Extended European Search Report for Appliaction No. 14864007.1, dated Jul. 6, 2017, pp. 15.
Extended European Search Report for Appliaction No. 14864908.0, dated Jul. 5, 2017, pp. 5.
Gretton, A., et al., "Covariate Shift by Kernel Mean Matching," in Dataset Shift in Machine Learning, Chapter 8, pp. 131-160, Quinonero-Candela, J., et al., eds., MIT Press (Dec. 12, 2008).
Extended European Search Report for Application No. 15761177.3, dated Aug. 30, 2017, pp. 10.

WEIGHT GENERATION IN MACHINE LEARNING

CROSS-REFERENCE TO RELATED APPLICATIONS

This application is related to U.S. patent application Ser. No. 15/261,390 entitled "WEIGHT BENEFIT EVALUATOR FOR TRAINING DATA", U.S. patent application Ser. No. 14/451,870 entitled "GENERATION OF WEIGHTS IN MACHINE LEARNING", and U.S. patent application Ser. No. 14/451,935 entitled "ALTERNATIVE TRAINING DISTRIBUTION DATA IN MACHINE LEARNING".

This application claims priority under 35 U.S.C. §119(e) to U.S. Provisional Patent Application No. 62/015,200 filed on Jun. 20, 2014 and U.S. Provisional Patent Application No. 61/907,499 filed on Nov. 22, 2013. The entirety of both of these applications is hereby incorporated by reference.

BACKGROUND

Unless otherwise indicated herein, the materials described in this section are not prior art to the claims in this application and are not admitted to be prior art by inclusion in this section.

Machine learning involves systems that may be trained with data in order to learn from the data and make generalizations based on the data. A trained machine learning system may take inputs and predict outputs or labels. In some examples, machine learning techniques may predict outputs by solving a classification or regression problem. Machine learning systems may be effective to classify data, make recommendations, and/or predict various outcomes based on training a learning algorithm with data.

SUMMARY

In some examples, methods in a machine learning environments are generally described. In various examples, the methods may include identifying, by a processor, a training distribution of a training data. In still other examples, the methods may also include identifying, by the processor, information about a test distribution of a test data. In other examples, the methods may also include identifying, by the processor, a coordinate of the training data and the test data. In yet other examples, the methods may also include determining, by the processor, for the coordinate, differences between the test distribution and the training distribution. In other examples, the methods may also include determining, by the processor, weights based on the differences. In some examples, the weights may be adapted to cause the training distribution to conform to the test distribution when the weights are applied to the training distribution.

In some examples, methods to determine a weight for training data are generally described. The methods may include, by a processor, identifying first points of the training data. In various other examples, the methods may also include, by the processor, identifying information about a test data. The test data may include second points. In other examples, the methods may also include, by the processor, identifying a coordinate of the first and second points. In some examples, the coordinate may include a range of values in a coordinate space. In various other examples, the methods may also include, by the processor, dividing the range of values in the coordinate space into bins. In some examples, respective bins may define subsets of the range of values. In other examples, the methods may also include, by the processor, determining a first frequency. In examples, the first frequency may relate to a first percentage of the first points being located within a particular bin. In various examples, the methods may also include, by the processor, determining a second frequency. The second frequency may relate to a second percentage of the second points being located within the particular bin. In some other examples, the methods may further include, by the processor, comparing the first frequency and the second frequency. In further examples, the methods may include, by the processor determining the weight for the training data, based at least in part on the comparison of the first and second frequencies.

In some other examples, computing devices are generally described. In some examples, the computing devices may include a processor and a memory configured to be in communication with the processor. In other examples, the memory may be effective to store training data. In various examples, the training data may include first points. In some examples, the memory may be effective to store test data. The test data may include second points. In some other examples, the processor may be effective to identify a coordinate of the first and second points. In various examples, the coordinate may include a range of values in a coordinate space. In some further examples, the processor may be effective to divide the range of values in the coordinate space into bins. In some examples, respective bins may define subsets of the range of values. In some examples, the processor may be effective to determine a first frequency. The first frequency may relate to a first percentage of the first points which are located within a particular bin. In further examples, the processor may be effective to determine a second frequency. In some cases, the second frequency may relate to a second percentage of the second points which are located within the particular bin. In various other examples, the processor may be further effective to compare the first frequency and the second frequency. In other examples, the processor may be further effective to determine a weight for the training data, based at least in part on the comparison of the first and second frequencies. In some examples, the memory may be further effective to the memory effective to store the weight.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
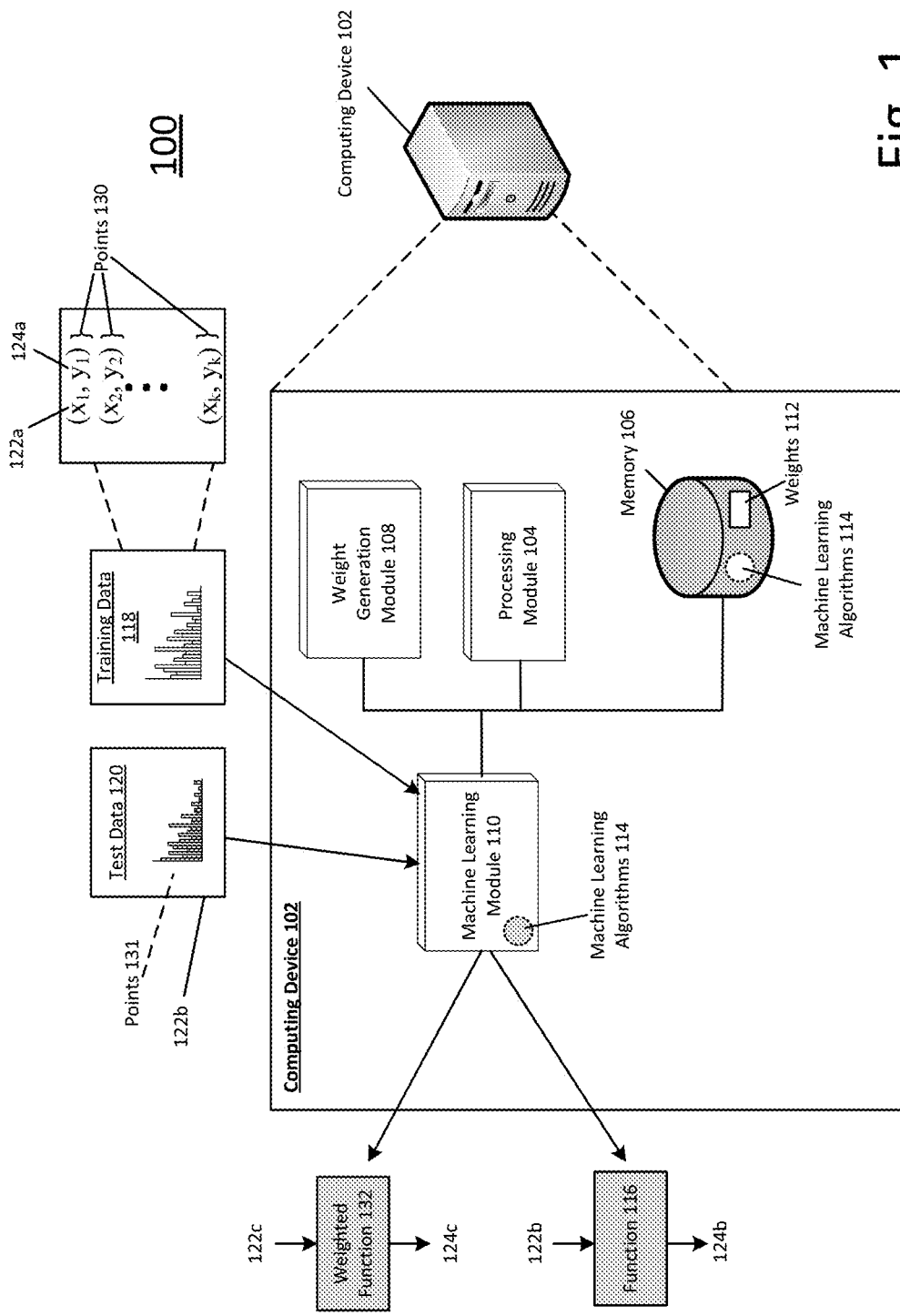
FIG. 1 illustrates an example system that can be utilized to implement weight generation in machine learning.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations.

This disclosure is generally drawn to, inter alia, methods, apparatus, systems, devices, and computer program products related to weight generation in machine learning.

Briefly stated, technologies are generally described for systems, devices and methods relating to a machine learning environment. In some examples, a processor may identify a training distribution of a training data. For example, the training data may include a set of points that follows a probability distribution, reflecting a probability of certain inputs or outputs. The processor may identify information about a test distribution of a test data. The processor may identify a coordinate of the training data and the test data. The coordinate may be, for example, a number of movies rated by users. The processor may determine, for the coordinate, differences between the test distribution and the training distribution such as differences in the popularity of movies. The processor may determine weights based on the differences. The weights may be adapted to cause the training distribution to conform to the test distribution when the weights are applied to the training distribution.

FIG. 1 illustrates an example system 100 that can be utilized to implement weight generation in machine learning, arranged according to at least some embodiments described herein. As depicted, system 100 may include a computing device 102. Computing device 102 may include a processing module 104, a memory 106, a weight generation module 108, and a machine learning module 110, all configured to be in communication with one another. Processing module 104 may be hardware and may be configured to execute one or more instructions. For example, processing module 104 may be configured to execute one or more instructions stored in memory 106. Memory 106 may be further effective to store one or more machine learning algorithms 114. Machine learning algorithms 114 may include instructions and/or sets of instructions effective to produce a function 116 when executed by machine learning module 110.

As will be discussed in further detail below, machine learning module 110 may be effective to use one or more machine learning algorithms 114 and training data 118 to generate or train function 116. An example of function 116 may be a function to determine a credit score. In some examples, training data 118 may include one or more points 130. Points 130 may include sets of associated inputs 122a and outputs 124a. For example, an input with an income X and debt Y may result in a credit score Z. In some examples, a training distribution of training data 118 may be identified by processing module 104. In various other examples, processing module 104 may be effective to identify points 130 of training data 118. Training data 118 may be stored in memory 106. Points 130 of training data 118 may follow a particular training distribution. For example, the training distribution may indicate a range of income levels at a first instance in time. In some examples, the training distribution may be a probability distribution. Training data 118 may be generated at an instance in time which may be prior to generation of function 116. In some examples, function 116 may be effective to determine outputs 124b (such as, for example, determinations, classifications, predictions, and/or recommendations) based on inputs 122b of test data 120 provided to function 116. In some examples, outputs 124b may be referred to as "labels."

Test data 120 may include a number of points 131 which may follow a particular test distribution. For example, the test distribution may indicate a range of income levels at a second instance in time. In some examples, test data 120 may be generated at an instance in time which is later than the instance in time at which training data 118 is generated. In some examples, the test distribution may be a probability distribution. The test distribution of test data 120 may be different from the training distribution of training data 118. In some examples, some information may be known about the test distribution of test data 120 prior to the input of test data 120 into function 116. For example, publicly available information such as census data, may be accessed to indicate changes in income or population between training and test data. In some examples, information about a test distribution of test data 120 may be identified by processing module 104. In some examples, information about a test distribution may include statistics such as a mean and/or standard deviation of the test distribution. Additionally, information about the test distribution may include estimations of projections of the test distribution. For example, histograms of points 131 along a coordinate may result in an estimate of the projection of the test distribution along the coordinate. Test data 120 and/or information about test data 120 may be stored in memory 106.

Weight generation module 108 may be effective to determine and/or calculate weights 112 for each point 130 of training data 118. Weights 112 may be applied to points 130 of training data 118 such that, after application of weights 112, points 130 of training data 118 may follow a probability distribution that resembles, matches, and/or conforms to the probability distribution of test data 120. Weights 112 may be adapted to cause the training distribution to conform to the test distribution. Machine learning module 110 may receive weights 112 from weight generation module 108. Machine learning algorithms 114 may use weights 112, and/or training data 118, to generate a weighted function 132. Weighted function 132 may be effective to determine outputs or labels 124c (such as, for example, determinations, classifications, predictions, and/or recommendations) based on the application of inputs 122c to weighted function 132. In some examples, some labels generated by weighted function 132 may be different from labels generated by function 116, even where the same input values are applied to function 116 and weighted function 132.

Figure 2:
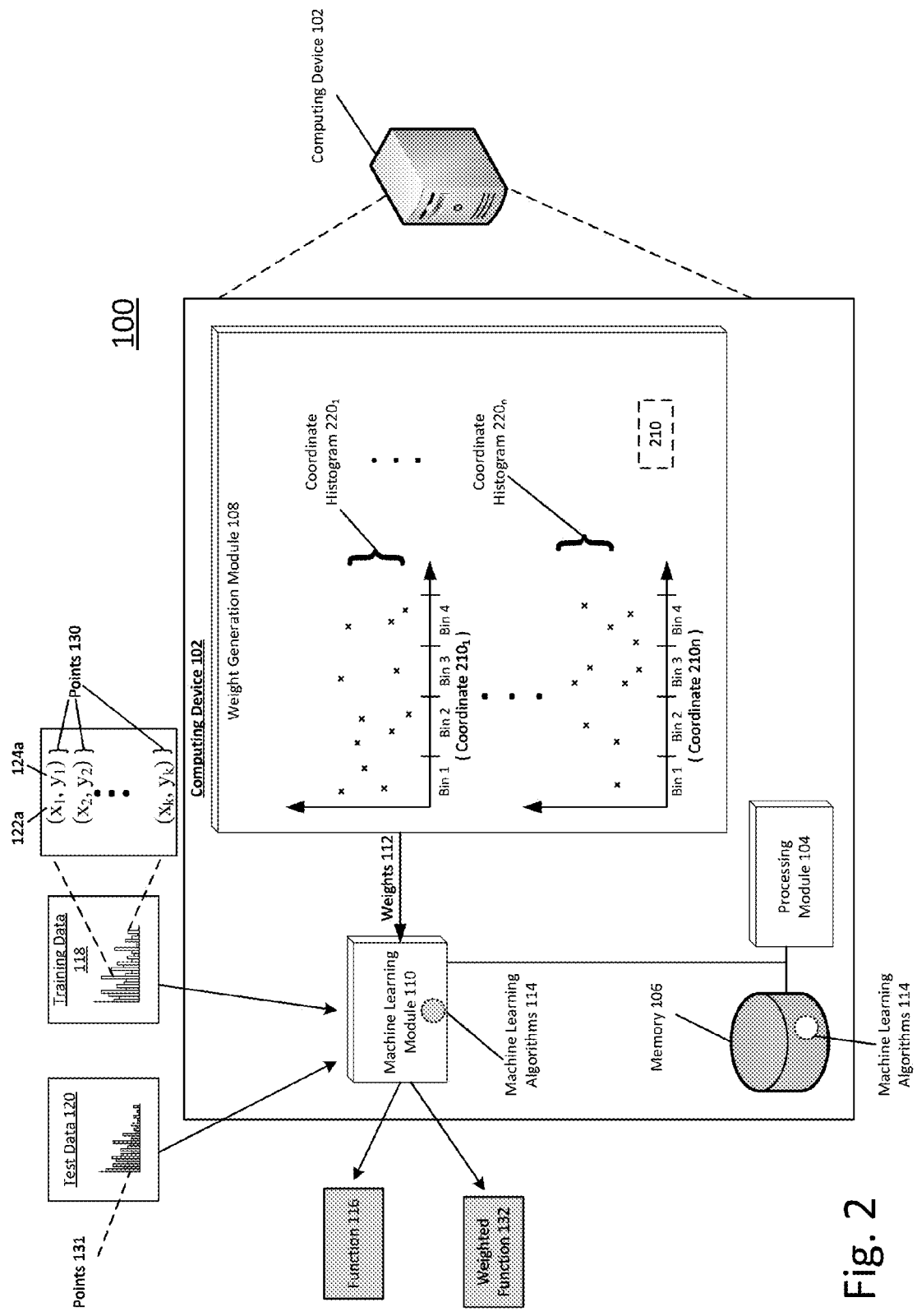
FIG. 2 depicts the example system of FIG. 1 with additional details related to a weight generation module.

FIG. 2 depicts the example system 100 of FIG. 1 with additional details related to a weight generation module, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity and brevity.

In some examples, as is explained in more detail below, weight generation module 108 may receive training data 118 from memory 106, or from another source. Weight generation module 108 may identify and/or choose one or more coordinates 210 (including, e.g., $210_1 \ldots 210_n$) of training data 118. Coordinates 210 may be, for example, one or more parameters or dimensions of points 130. Each of coordinates 210 may include a range of values in a coordinate space. A coordinate space may be, for example, a Euclidean or other geometric space for a particular coordinate 210. For example, if machine learning module 110 relates to generation of a credit score, coordinate 210 may relate to income, debt, etc. Weight generation module 108 may divide the range of values of each coordinate space into one or more bins. Respective bins may define subsets of the range of values for each coordinate. For example, weight generation module 108 may divide each identified and/or chosen coordinate 210 into one or more bins (such as, for example, "Bin 1", "Bin 2", "Bin 3", etc.).

In further summarizing the detailed discussion below, weight generation module 108 may determine respective values for points 130 along each identified chosen coordinate 210. Weight generation module 108 may determine frequencies of a number of points 130, 131 located within respective bins, for respective coordinates 210. A frequency may be, for example, a percentage of points 130 located within a particular bin, relative to the total number of points 130, for a particular coordinate 210. Weights 112 may be chosen for each point 130 of training data 118, based on the frequency of points 130 located in each bin, for each coordinate, and based on information about points in test data 120. Machine learning module 110 may produce weighted function 132 based on weights 112 and/or training data 118.

Inputs 122a of training data 118 may be vectors which may include one or more parameters. In an example where machine learning algorithms 114 are designed to produce a function to recommend movies to a user, some example parameters of inputs 122a may include an age of the user, an annual salary, a number of movies rated by the user, a location where the user lives, etc. Weight generation module 108 may choose one or more of the parameters as coordinates 210 (including coordinates $210_1, 210_2, \ldots, 210_n$). Weight generation module 108 may be effective to evaluate points 130 by examining each point of points 130 on a coordinate-by-coordinate basis. Each coordinate 210 may be divided into a number of bins (such as "Bin 1", "Bin 2", "Bin 3", etc.). In an example where the chosen coordinate 210 is annual salary, Bin 1 may range from $0-$25,000, Bin 2 may range from $25,000-$50,000, Bin 3 may range from $50,000-$75,000, etc. Each point 130 may include a parameter related to annual salary. A location of each point of points 130 may be determined along the annual salary coordinate 210. For example, a first point of points 130 may include an annual salary parameter value of $42,000. Accordingly, the first point may be located in Bin 2. The number of points 130 located within each bin may be determined by weight generation module 108 and may be divided by the total number of points 130 to produce a frequency for each bin. As will be described in further detail below, weights 112 may be determined and/or calculated based on differences between frequencies calculated for the training distribution and frequencies calculated for the test distribution.

Weight generation module 108 may generate weights 112 using equation (1):

$$\omega_i = 1 + \Sigma_{c=1}^{C} \mu_c(\theta_c(i)) \text{ for } i \in R \quad (1)$$

where $\omega_i$ may be a weight (e.g., one weight of weights 112) for a particular point i among points 130. $\mu_c$ may quantify a difference between the number of points 131 in test data 120, in a particular bin (such as, for example, "Bin 1", "Bin 2", "Bin 3", and/or "Bin 4"), and the weighted sum of the number of points 130 in training data 118, in the particular bin, divided by the number of points in training data 118, in the particular bin. In some examples, $\mu_c$ may be calculated for each coordinate c (of coordinates 210). C may represent the total number of identified and/or chosen coordinates 210. $\theta_c$ may be a function that may determine in which bin a particular point i, of points 130, falls.

Weight generation module 108 may determine the values for $\mu_c$ using equation (2):

$$\mu_c(\tau_c) = \frac{1}{n_c(\tau_c)} \left( N_R v_c(\tau_c) - n_c(\tau_c) - \sum_{\substack{i \in R \\ \theta_c(i) = \tau_c}}^{c} \sum_{k \ne c}^{c} \mu_k(\tau_c) \right) \quad (2)$$

$n_c$ may be a vector representing the current count number of points 130 in training data 118 in each of the bins, of a particular coordinate c, among coordinates 210. $\tau_c$ may represent the current count number of bins for a particular coordinate C. $N_R$ may represent the number of points 130 in training data 118. $v_c$ may represent a frequency of points in test data 120 appearing in a particular bin (such as, for example, "Bin 1", "Bin 2", "Bin 3", "Bin 4", etc.), for a particular coordinate c among coordinates 210, relative to the total number of points 130.

An iterative process may be used by weight generation module 108 to determine $\mu_c$. In some examples, all $\mu_c$ may be initialized to zero or some other value. A first comparison value $\mu_c(\tau_c)$ may be identified for each bin of each coordinate using equation (2). The computed value of $\mu_c(\tau_c)$ may be plugged into equation (2) iteratively, to produce difference values. A value of $\mu_c(\tau_c)$ may be iteratively updated until a convergent value of $\mu_c(\tau_c)$ is reached. The convergent value of $\mu_c(\tau_c)$ may be used in equation (1) to produce weights 112 for each point 130 of training data 118. In some examples, values of $\mu_c(\tau_c)$ used while iterating equation (2) may be based on fractions of differences of values used in the previous iteration according to equation (3):

$$\mu'_{new} = \alpha * \mu_{new} + (1-\alpha) * \mu_{old} \quad (3)$$

with $\alpha=0.1$ or $\alpha=0.01$ where $\mu_{old}$ may be the value of $\mu$ used during a previous iteration of equation (2) to compute $\mu_{new}$. Equation (3) may use $\mu_{new}$ and $\mu_{old}$ to calculate $\mu'_{new}$, which may be used in subsequent iterations of equation (2). $\alpha$ may be a variable used to control a degree to which new values of $\mu$ (e.g., $\mu'_{new}$) depend upon previous values of $\mu$ (e.g., $\mu_{old}$), when iterating equation (2).

Among other potential benefits, weight generation in machine learning arranged in accordance with the present disclosure may allow for simplified matching of test and training distributions to improve the predictive capability of machine learning systems. Additionally, by choosing a number of bins on a coordinate-by-coordinate basis, weight generation in machine learning in accordance with the present disclosure may account for differences between training data sets and test data sets which result from the effects of a finite sample size. Changes may be identified between training data and test data which may occur over time as a result of changing opinions, trends, fashions, etc. In some examples, taking such changes into account may result in machine learning systems with better predictive ability. Recommendation systems or predictions of time series like the stock market, may benefit from the described system.

Figure 3:
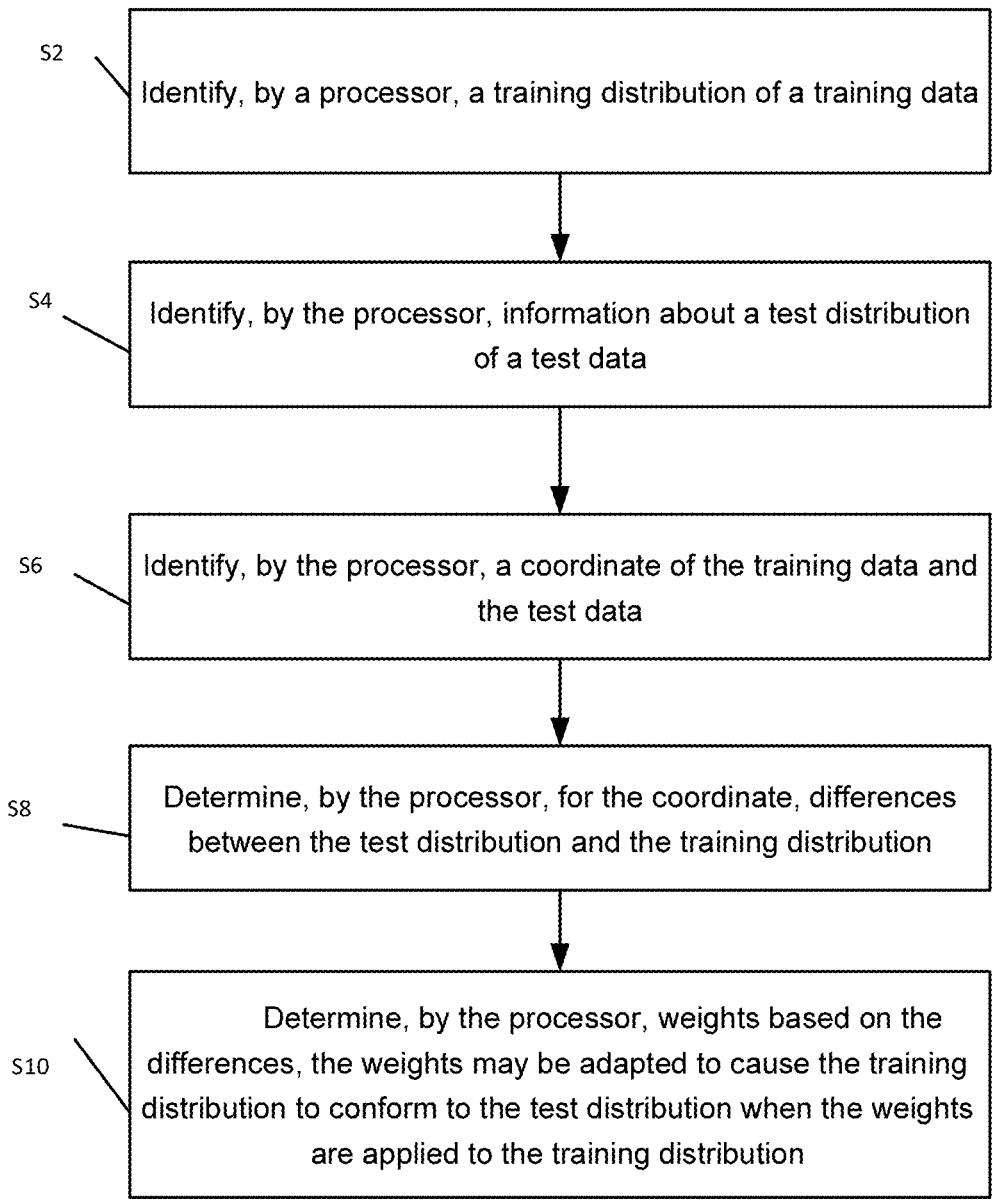
FIG. 3 depicts a flow diagram for an example process to implement weight generation in machine learning.

FIG. 3 depicts a flow diagram for example process to implement weight generation in machine learning, arranged in accordance with at least some embodiments described herein. In some examples, the process in FIG. 3 could be implemented using system 100 discussed above and could be used to generate weights for machine learning. An example process may include one or more operations, actions, or functions as illustrated by one or more of blocks S2, S4, S6, S8 and/or S10, etc. Although illustrated as discrete blocks, various blocks may be divided into additional blocks, combined into fewer blocks, or eliminated, depending on the particular implementation. Blocks may be supplemented with additional blocks representing other operations, actions, or functions. The process in FIG. 3 may be used by a processor, such as processing module 104, or by a machine learning module, such as machine learning module 110, as described above.

Processing may begin at block S2, "Identify, by the processor, a training distribution of a training data." At block S2, a processor may identify a training distribution of training data.

Processing may continue from block S2 to block S4, "Identify, by the processor, information about a test distribution of a test data." At block S4, the processor may identify information about a test distribution of the test data. In an example, the training data may be generated at a first instance in time and the test data may be generated at a second instance in time. The second instance in time may be later than the first instance in time.

Processing may continue from block S4 to block S6, "Identify, by the processor, a coordinate of the training data and the test data." At block S6, the processor may identify a coordinate of the training data and the test data. In some examples, a range of values in coordinate spaces may be divided into a number of bins. For example, a coordinate 210 may be divided into one or more bins, such as "Bin 1", "Bin 2", "Bin 3", etc., as depicted in FIG. 2.

Processing may continue from block S6 to block S8, "Determine, by the processor, for the coordinate, differences between the test distribution and the training distribution." At block S8, the processor may determine, for the coordinate, differences between the test distribution and the training distribution.

Processing may continue from block S8 to block S10, "Determine, by the processor, weights based on the differences, the weights may be adapted to cause the training distribution to conform to the test distribution when the weights are applied to the training distribution." At block S10, the processor may determine weights based on the differences. The weights may be adapted to cause the training distribution to conform to the test distribution when the weights are applied to the training distribution. For example, weights and training data may be applied to machine learning algorithm to generate weighted function. Test data may be applied to the weighted function as an input. In an example, labels may be generated in response to application of the test data to the weighted function. In some examples, the labels may include at least one of recommendations, classifications, predictions, and/or determinations. In some examples, determining the weights may include iteratively determining differences between the training distribution and the test distribution. In some further examples, the weights may be determined based on a convergent value of the differences between the training distribution and the test distribution. In some other examples, determining the weights may be further based on the number of the first and second points which are located in bins. In another example, weights may be effective to conform a particular point in the training distribution to a particular point in the test distribution.

Figure 4:
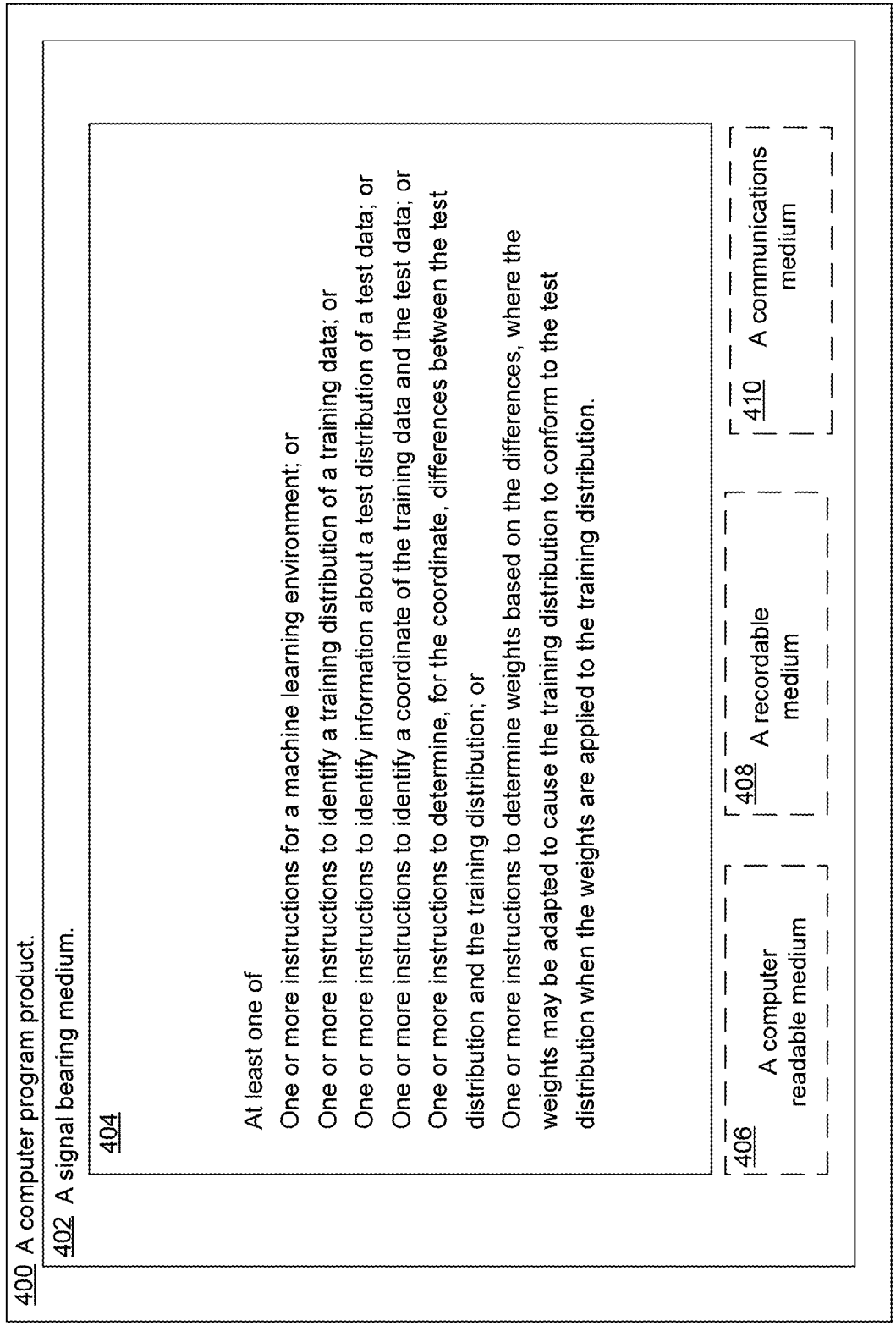
FIG. 4 illustrates an example computer program product that can be utilized to implement weight generation in machine learning.

FIG. 4 illustrates an example computer program product 400 that can be utilized to implement weight generation in machine learning, arranged in accordance with at least some embodiments described herein. Program product 400 may include a signal bearing medium 402. Signal bearing medium 402 may include one or more instructions 404 that, in response to execution by, for example, a processor, may provide the functionality and features described above with respect to FIGS. 1-3. Thus, for example, referring to system 100, processing module 104 and/or machine learning module 110 may undertake one or more of the blocks shown in FIG. 4 in response to instructions 404 conveyed to system 100 by medium 402. In some examples, instructions 404 may be stored in a memory, such as memory 106.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

Figure 5:
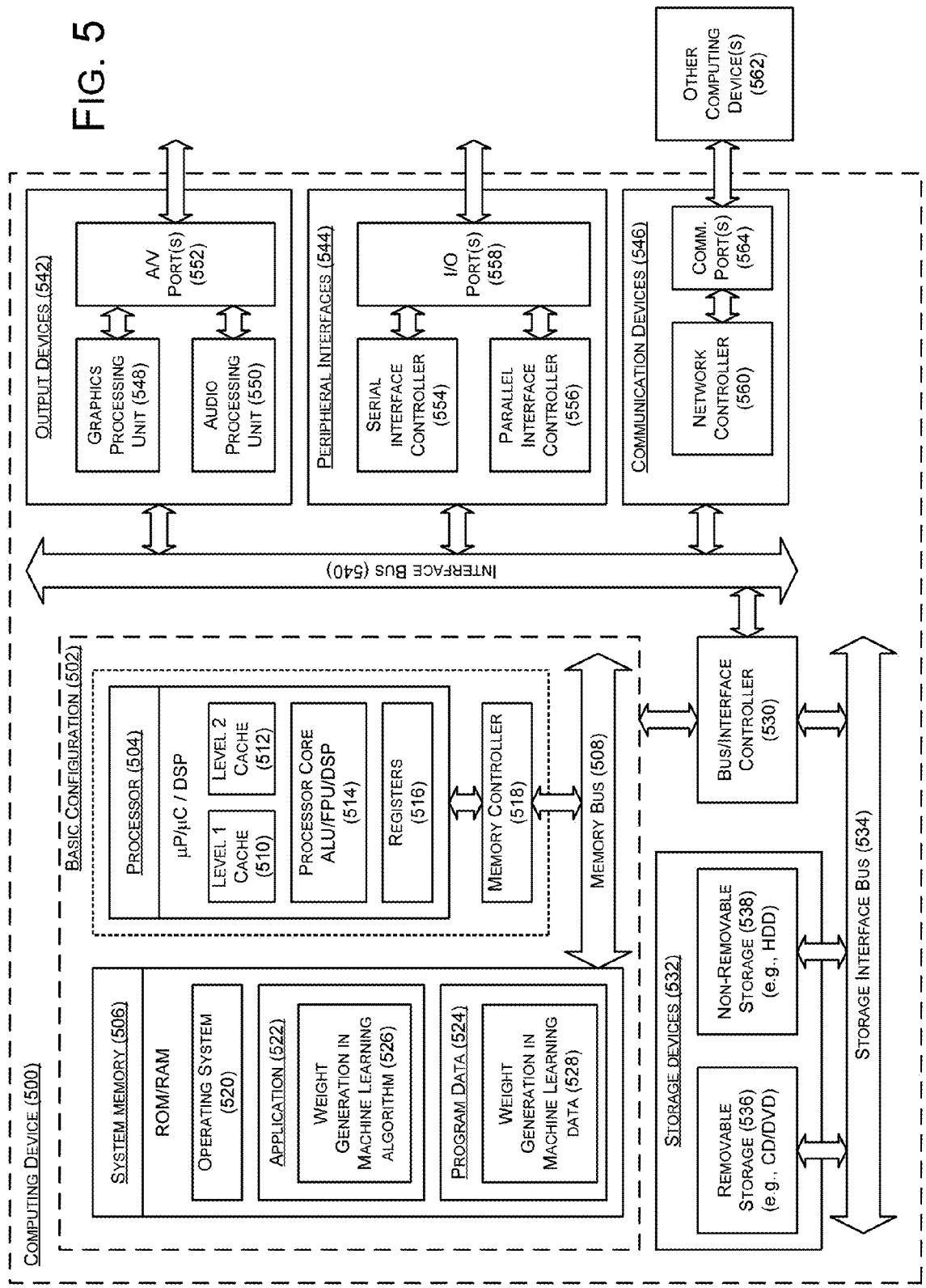
FIG. 5 is a block diagram illustrating an example computing device that is arranged to implement weight generation in machine learning.

FIG. 5 is a block diagram illustrating an example computing device 500 that is arranged to implement weight generation in machine learning, arranged in accordance with at least some embodiments described herein. In a very basic configuration 502, computing device 500 typically includes one or more processors 504 (such as, for example, processing module 104) and a system memory 506 (such as, for example, memory 106). A memory bus 508 may be used for communicating between processor 504 and system memory 506.

Depending on the desired configuration, processor 504 may be of any type including but not limited to a microprocessor ($\mu$P), a microcontroller ($\mu$C), a digital signal processor (DSP), or any combination thereof. Processor 504 may include one more levels of caching, such as a level one Cache 510 and a level two Cache 512, a processor Core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any Type including but not limited to volatile memory (such as RAM), non-volatile memory (such as ROM, flash memory, etc.) or any combination thereof. System memory 506 may include an operating system 520, one or more applications 522, and program data 524. Application 522 may include weight generation in machine learning algorithm 526 that is arranged to perform the functions and operations as described herein including those described with respect to FIGS. 1-4 in connection with system 100. Program data 524 may include weight generation in machine learning data 528 that may be useful to implement weight generation in machine learning as is described herein. In some embodiments, application 522 may be arranged to operate in cooperation with program data 524 and/or operating system 520 such that weight generation in machine learning may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDDs), optical disk drives such as compact-disc (CD) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 Cells refers to groups having 1, 2, or 3 Cells. Similarly, a group having 1-5 Cells refers to groups having 1, 2, 3, 4, or 5 Cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to improve predictive capability of a machine learning system, the method comprising:
    receiving, by a computer, training data that includes one or more points;
    identifying, by the computer, a training distribution of the one or more points of the training data;
    receiving, by the computer, test data that includes one or more points;
    identifying, by the computer, information about a test distribution of the one or more points of the test data;
    identifying, by the computer, one or more coordinates for the one or more points of the training data and the one or more points of the test data;
    determining, for each identified coordinate and by the computer differences between the one or more points of the test data and the one or more points of the training data;
    determining, by the computer, weights for the one or more points of the training data based on the determined differences, wherein the weights are adapted to cause the training distribution to conform to the test distribution in response to the weights being applied to the training distribution;
    generating, by the computer, a weighted function based on the determined weights and the training data; and
    generating, by the computer, a first output based on an application of an input to the generated weighted function, wherein the first output is different than a second output generated by an application of the input to a non-weighted function, wherein the first output and the second output respectively correspond to a first predictive capability and a second predictive capability of the machine learning system, and wherein the first predictive capability is greater than the second predictive capability.

2. The method of claim 1, wherein generating the first output includes generating at least one of a recommendation, a classification, a prediction, and a determination.

3. The method of claim 1, wherein:
    the training data is generated at a first instance in time; and
    the test data is generated at a second instance in time, wherein the second instance in time is later than the first instance in time.

4. The method of claim 1, wherein determining the weights comprises:
    iteratively determining, for each identified coordinate, differences between the one or more points of the training data and the one or more points of the test data, wherein the weights for the one or more points of the training data are determined based on a convergent value of the differences between the one or more points of the training data and the one or more points of the test data.

5. The method of claim 1, wherein identifying the one or more coordinates includes identifying a range of values in a coordinate space, and wherein the method further comprises:
    dividing the range of values in the coordinate space into bins,
    wherein determining the weights is based on a number of the one or more points in the training data and a number of the bins.

6. The method of claim 1, wherein the one or more points of the test data and the one or more points of the training data include at least one first point and at least one second point, respectively, wherein the one or more coordinates include a range of values in a coordinate space, and wherein the method further comprises:
    dividing the range of values in the coordinate space into bins,
    wherein determining the weights is based on a number of the at least one first point and a number of the at least one second point which are located in the bins.

7. A method to improve predictive capability of a machine learning system, the method comprising, by a computer:
identifying first points of training data;
identifying information about test data, wherein the test data includes second points;
identifying a coordinate of the first points and the second points, wherein the coordinate includes a range of values in a coordinate space;
dividing the range of values in the coordinate space into bins, wherein the bins define subsets of the range of values;
determining a first frequency, wherein the first frequency relates to a first percentage of the first points being located within a particular bin;
determining a second frequency, wherein the second frequency relates to a second percentage of the second points being located within the particular bin;
comparing the first frequency and the second frequency;
determining a weight for the training data, based at least, in part, on the comparison of the first frequency and the second frequency, and on a number of the bins;
generating a weighted function based on the determined weight and the training data; and
generating a first output based on an application of an input to the generated weighted function, wherein the first output is different than a second output generated by an application of the input to a non-weighted function, wherein the first output and the second output respectively correspond to a first predictive capability and a second predictive capability of the machine learning system, and wherein the first predictive capability is greater than the second predictive capability.

8. The method of claim 7, wherein:
the first points follow a training distribution,
the second points follow a test distribution, and
the weight is effective to conform a particular point in the training distribution to a particular point in the test distribution.

9. The method of claim 7, wherein comparing the first frequency and the second frequency includes:
identifying a first comparison value;
comparing frequency values of the test data and the training data in the bins to produce a difference value;
updating the first comparison value to produce a second comparison value based on the difference value; and
iteratively repeating the identifying the first comparison value, comparing frequency values of the test data and the training data in the bins to produce the difference value, and updating the first comparison value to produce the second comparison value based on the difference value, until the second comparison value converges to a convergent value.

10. The method of claim 9, wherein updating the first comparison value to produce the second comparison value based on the difference value comprises:
adding a fraction of the difference value to the first comparison value to produce the second comparison value.

11. The method of claim 7, wherein determining the weight for the training data is based on a number of the first points.

12. The method of claim 7, wherein determining the weight for the training data is based on a number of the first points and a number of the second points which are located in the bins.

13. A computing device, comprising:
a first processor;
a second processor; and
a memory configured to be in communication with the first processor and the second processor, the memory effective to store training data and test data, wherein the training data comprises first points and the test data comprises second points, and wherein:
the first processor is effective to:
identify a coordinate of the first points and the second points, wherein the coordinate includes a range of values in a coordinate space;
divide the range of values in the coordinate space into bins, wherein the bins define subsets of the range of values;
determine a first frequency, wherein the first frequency relates to a first percentage of the first points being located within a particular bin;
determine a second frequency, wherein the second frequency relates to a second percentage of the second points being located within the particular bin;
compare the first frequency and the second frequency; and
determine a weight for the training data, based at least, in part, on the comparison of the first frequency and the second frequency, and on a number of bins,
the second processor is effective to:
generate a weighted function based on the determined weight and the training data; and
generate a first output based on an application of an input to the generated weighted function, wherein the first output is different than a second output generated by an application of the input to a non-weighted function, wherein the first output and the second output respectively correspond to a first predictive capability and a second predictive capability of the computing device, and wherein the first predictive capability is greater than the second predictive capability, and
the memory is further effective to store the determined weight.

14. The computing device of claim 13, wherein:
the first points follow a training distribution,
the second points follow a test distribution, and
the weight is effective to conform a particular point in the training distribution to a particular point in the test distribution.

15. The computing device of claim 13, wherein the first processor is further effective to:
identify a first comparison value;
compare frequency values of the test data and the training data in the bins to produce a difference value;
update the first comparison value to produce a second comparison value based on the difference value;
iteratively repeat the identification of the first comparison value, the comparison of frequency values of the test data and the training data in the bins to produce the difference value, and the update of the first comparison value to produce the second comparison value based on the difference value, until the second comparison value converges to a convergent value; and
store the converged second comparison value in the memory.

16. The computing device of claim 15, wherein the first processor is further effective to update the first comparison value to produce the second comparison value based on the difference value, by addition of a fraction of the difference value to the first comparison value.

17. The computing device of claim 13, wherein the second processor is further effective to:
   store the weighted function in the memory.

18. The computing device of claim 13, wherein the first processor is effective to determine the weight for the training data based on a number of the first points.

19. The computing device of claim 13, wherein the processor is effective to determine the weight for the training data based on a number of the first points and a number of the second points which are located in the bins.

20. A computer-implemented method to improve predictive capability of a machine learning system, the method comprising:
   receiving, by a weight generation module of the machine learning system, training data that includes one or more training points;
   identifying, by a processor of the machine learning system, a training distribution of the one or more training points of the training data;
   retrieving, by the weight generation module of the machine learning system, test data from a memory of the machine learning system, wherein the test data is different from the training data, and wherein the test data includes one or more test points;
   identifying, by the processor of the machine learning system, information about a test distribution of the one or more test points of the test data;
   identifying, by the weight generation module of the machine learning system, one or more coordinates for the one or more training points of the training data and the one or more test points of the test data;
   determining, based on the identified information and by the weight generation module of the machine learning system and for each identified coordinate, differences between the one or more test points of the test data and the one or more training points of the training data;
   determining, by the weight generation module of the machine learning system and based on the determined differences, weights for the one or more points of the training data, wherein:
      the weights are adapted to cause the training distribution to conform to the test distribution in response to the weights being applied to the training distribution,
      the training data includes a number of points, and
      each coordinate includes a range of values in a coordinate space;
   dividing the range of values in the coordinate space into bins;
   calculating a frequency of each bin based on a number of points in each bin and a total number of points included in the training data, wherein determining the weights is based on the calculated frequency of each bin and a number of the bins;
   transmitting, by the weight generation module of the machine learning system, the determined weights and the training data to a machine learning module of the machine learning system;
   producing, by the machine learning module of the machine learning system, a weighted function based on the determined weights and the training data, wherein the weighted function corresponds to a first predictive capability greater than a second predictive capability that corresponds to a function produced based on the training data; and
   operating the machine learning system to use the weighted function to provide the first predictive capability.

* * * * *

UNITED STATES PATENT AND TRADEMARK OFFICE
CERTIFICATE OF CORRECTION

PATENT NO. : 9,858,534 B2
APPLICATION NO. : 14/451899
DATED : January 2, 2018
INVENTOR(S) : Abu-Mostafa et al.

It is certified that error appears in the above-identified patent and that said Letters Patent is hereby corrected as shown below:

On the Title Page

On Page 3, in Item (56), under "OTHER PUBLICATIONS", in Column 2, Line 23, delete "Appliaction No." and insert -- Application No. --, therefor.

On Page 3, in Item (56), under "OTHER PUBLICATIONS", in Column 2, Line 25, delete "Appliaction No." and insert -- Application No. --, therefor.

In the Specification

In Column 3, Line 3, delete "learning;" and insert -- learning; and --, therefor.

In Column 3, Line 6, delete "learning;" and insert -- learning, --, therefor.

In Column 8, Line 16, delete "herein. Program" and insert -- herein. Computer program --, therefor.

In Column 8, Line 25, delete "by medium" and insert -- by signal bearing medium --, therefor.

In Column 8, Line 29, delete "hard disk drive," and insert -- hard disk drive (HDD), --, therefor.

In Column 8, Line 38, delete "communications link," and insert -- communication link, --, therefor.

In Column 8, Line 39, delete "example, program" and insert -- example, computer program --, therefor.

In Column 8, Line 59, delete "one more" and insert -- one or more --, therefor.

In Column 8, Lines 65-66, delete "implementations memory" and insert -- implementations, memory --, therefor.

Signed and Sealed this
First Day of May, 2018

Andrei Iancu
*Director of the United States Patent and Trademark Office*

CERTIFICATE OF CORRECTION (continued)
U.S. Pat. No. 9,858,534 B2

In Column 10, Line 59, delete "recitation no" and insert -- recitation, no --, therefor.

In Column 11, Line 14, delete "general such" and insert -- general, such --, therefor.

In Column 11, Line 21, delete "general such" and insert -- general, such --, therefor.